Feb. 25, 1964 A. E. MALDEN 3,122,630

PARITY CIRCUIT

Filed Dec. 29, 1961 2 Sheets-Sheet 1

ADDITION TRUTH TABLE

| | ADDEND | | AUGEND | | SUM |
|---|---|---|---|---|---|
| a. | EVEN | + | EVEN | = | EVEN |
| b. | EVEN | + | ODD | = | ODD* |
| c. | ODD | + | EVEN | = | ODD |
| d. | ODD | + | ODD | = | EVEN* |

INVENTOR.
ANCILE EUGENE MALDEN

BY David N. Koffsky

AGENT

Feb. 25, 1964 A. E. MALDEN 3,122,630

PARITY CIRCUIT

Filed Dec. 29, 1961 2 Sheets-Sheet 2

United States Patent Office 3,122,630
Patented Feb. 25, 1964

3,122,630

PARITY CIRCUIT

Ancile E. Malden, Kingston, N.Y., assignor to International Business Machines Corporation, New York, N.Y., a corporation of New York Filed Dec. 29, 1961, Ser. No. 163,099
4 Claims. (Cl. 235—153)

This invention relates to data transfer circuitry and, more particularly, to serial digital data transfer circuitry with a provision for parity bit generation.

Parity checking, as is well known in the digital data processing art, entails the establishment of a standard in a computer that all "character" lengths of digital information will have either an odd or even number of One bits. Once this standard is established, for example, odd, any digital character having an even number of One bits which is entered into the computer must have a parity bit added thereto to satisfy the odd parity condition, whereas a character having an odd number of One bits remains unchanged. In this manner (for the example selected) all characters are caused to have an odd number of One bits. Within the computer, it may then be easily determined if any One bits have been lost or destroyed by merely checking the parity of each character as it passes from operation to operation.

When digital data is entered into a computer from pre-punched tapes or cards, there is no problem in merely instructing the punch operation to provide all characters with an odd number of One bits. However, in digital control systems, it is often necessary to utilize data taken directly from a digital transducer wherein there is no provision for parity bit generation. For this reason some means for the parity bit generation must be provided.

Data taken from a digital transducer is easily entered into the computer through the use of a serial shift register. This enables a plurality of characters to be inserted into the computer's buffer storage unit in parallel; however, in serial shift registers now known in the art, there is no provision for the generation of parity bits.

Accordingly, it is an object of this invention to provide a parity bit generation circuit which is usable with a serial shift register.

It is another object of this invention to provide extremely simple circuitry to accomplish the above object.

It is a further object to provide a parity generation circuit which can be appended to a serial shift register without the necessity of making major structural modifications to the register itself.

It is another object of this invention to provide a circuit which can act either as a parity generation circuit or a parity check circuit.

In accordance with above objects, a standard serial shift register, capable of receiving a plurality of character lengths of digital data, is provided with bistable sensing means at the beginning of each character length of information. As the binary information is serially shifted into the register, the bistable means indicate whether an odd or even number of One bits have been shifted into their respective characters. Assuming, for example, that an odd parity is desired, the bistable means are caused to assume their One state when indicating an even number of One bits and their Zero state to indicate an odd number of One bits. Thus, by appending the One indication from the bistable means to its associated character, which has an even number of One bits, the Odd parity requirement is satisfied.

When the register is full, however, not all of the bistable means necessarily indicate the correct parity for the characters they individually represent due to the fact that the characters are serially entered into the register. In determining how to correct these erroneous indications, it has been observed that any bistable means which directly precedes a bistable means in its odd state, incorrectly indicates the parity of its associated character. A bistable means which "precedes" another bistable means is one which is impulsed first in time by the incoming binary information. Similarly, a bistable means which "succeeds" another bistable means is one which is impulsed later in time by the incoming binary information. Therefore, after all characters have been shifted into the register, the state of any bistable means which directly precedes a bistable means in its odd state is reversed, thereby resulting in a correct parity indication for all characters.

The foregoing and other objects, features and advantages of the invention will be apparent from the following more particular description of a preferred embodiment of the invention, as illustrated in the accompanying drawings.

Figures 1, 2:
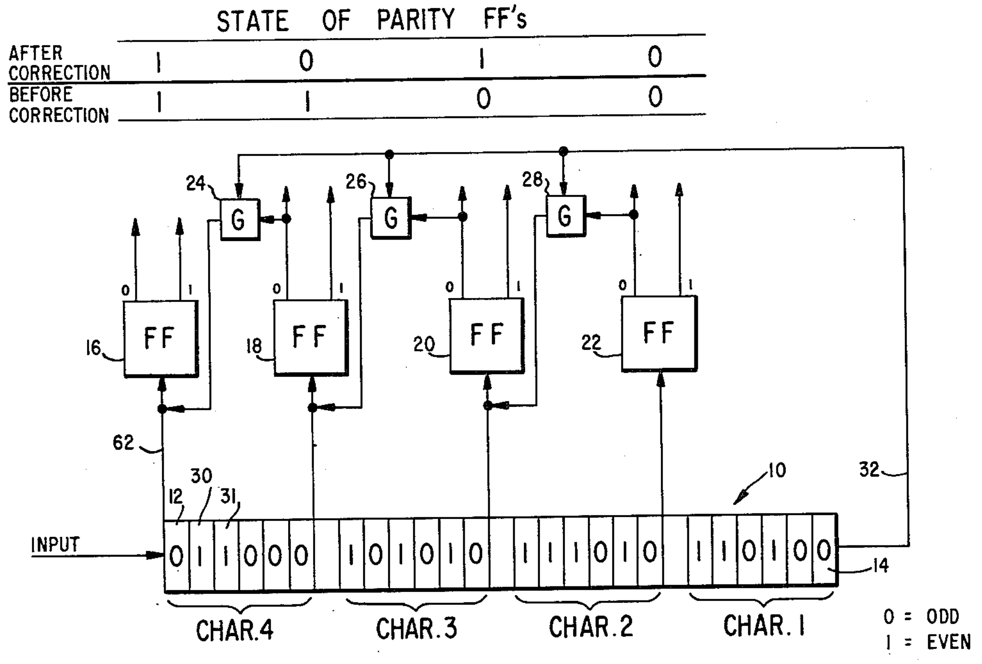
FIG. 1 is a block diagram of a four character serial shift register with the basic elements of the parity generation circuit.
FIG. 2 is a truth table which governs the operation of the parity bit generation circuit.

Referring now to FIG. 1, there is shown a block diagram of a 24 bit serial shift register 10, the operation of which is well known in the art. The 24 bits are grouped so as to form four characters of 6 bits each. Connected at the input of each character is a bistable parity flip-flop. Flip-flop 16 is the parity generator for character 4; flip-flop 18, the parity generator for character 3; and flip-flops 20 and 22 are the parity generators for characters 2 and 1 respectively.

The Ones and Zeros shown in the various bit positions of serial shift register 10 are merely a chosen example to be used in the explanation of the operation of this device. It is assumed, for example, that the desired parity of all characters is Odd.

As the bits of information are shifted into register 10, parity flip-flops 16, 18, 20 and 22 are also in operation. Each time a One bit is entered into the first position 12 of character 4, parity flip-flop 16 is caused to change to its opposite stable state by virtue of an impulse received on conductor 62. A like occurrence is manifested at parity flip-flops 18, 20, and 22 as the respective One bits are shifted down register 10. When all character positions in the register are filled, only parity flip-flop 22 necessarily manifests the correct parity for its associated character. For the chosen example, flip-flop 22 manifests its Zero state because of the passage of an odd number of One bits (three) into the bit positions of character 1. However, note that flip-flop 20 will have been impulsed 7 times (by the seven One bits which now reside in characters 2 and 1) and its Zero output will be energized, whereas the correct parity for character 2, it having an even number of One bits, requires that flip-flop 20 manifests its One state. Parity flip-flop 18, having been impulsed 10 times, and parity flip-flop 16, having been impulsed 12 times, will both have their One outputs energized, (whereas parity flip-flop 18 should manifest a Zero output). Thus, it is obvious that the parity indication of parity flip-flop 16 is valid only for the sum of the One bits in characters 4, 3, 2 and 1: flip-flop 18 for the One bits in characters 3, 2, and 1; flip-flop 20 for the One bits of characters 2 and 1; and flip-flop 22 for character 1 alone.

It should be evident therefore that the parity manifestations of the various parity flip-flops other than flip-flop 22 may not provide true indications of the parities for their respective characters after the data has been entered into the register. As stated in the introduction, the basic principle which provides for the correction of the parity manifestations is that any parity manifestations which immediately precedes an "odd" parity manifestation must be erroneous and is to be corrected. That this is true can be seen from an examination of the truth table shown in FIG. 2.

Examples *a, b, c,* and *d* in FIG. 2 represent the odd or even characteristic of a sum when any of four possible combinations of two numbers, either odd or even, are added. In examples *a* and *c* it can be seen that when the augend is even, the sum will be identical to its respective addend; i.e., if the addend is even so also will the sum be even, and if the addend is odd, the sum will be odd. Examples (*b*) and (*d*) tell a different story however, for here it is obvious that where the augend is odd, the sum invariably manifests the opposite state to that of the addend; i.e., if addend is even, then the sum will be odd, etc.

Applying this truth table to the circuit of FIG. 1, it should first be realized that each parity flip-flop except parity flip-flop 22 represents a sum. Parity flip-flop 20 represents the parity of the sum of the One bits in characters 1 and 2; parity flip-flop 18, the sum of the One bits in characters 1, 2 and 3 and parity flip-flop 16, the sum of the One bits in characters 1–4. Considering now only characters 1 and 2, where as parity flip-flop 20 represents the parity of the sum of the One bits in words, 1 and 2, parity flip-flop 22 represents the correct parity of the One bits in character 1, and may be thought of as the "augend" of characters 1 and 2. Characters 2 may be likened to the addend of characters 1 and 2. If, for instance, parity flip-flop 22 manifests its even (One) state indicating that character 1, as the augend, has an even number of One bits, and parity flip-flop 20 also manifests an even sum parity (One) then by example (*a*) of the truth table of FIG. 2, the parity of character 2, as the addend, must also be even. Therefore, parity flip-flop 20 indicates the correct parity for its associated character. If, on the other hand, parity flip-flop 22 (augend) manifests an odd parity (Zero), then no matter what parity is manifested by a parity flip-flop 20 (as the sum) it can be seen from examples (*b*) and (*d*) of FIG. 2 that it must be exactly opposite to the correct parity indication for the addend (character 2). Under these circumstances the parity indication of parity flip-flop 20 must be changed for it to indicate the correct parity for character 2.

The same principles hold true for any two successive parity generators. For instance, flip-flop 18 represents the correct parity indication for the sum of the One bits in characters 3, 2 and 1 and, as such, comprises the augend of the truth table of FIG. 2. The state of parity flip-flop 16 represents the "sum" parity indication of characters 4, 3, 2, and 1. If flip-flop 18 is in its Zero state (manifesting an odd parity), it indicates that the sum parity shown in flip-flop 16 is directly opposite to that which is correct for character 4. The state of flip-flop 16, therefore, must be reversed for it to indicate the correct parity.

Referring now back to FIG. 1, the truth table of FIG. 2 is implemented in the parity generation circuit by gates 24, 26, 28 and conductor 32. In this example a "flag" bit is utilized to trigger the parity correction process. The flag bit is inserted into the first position 12 of character 4 before any information is entered into register 10. As the register is then serially filled with digital information, the flag bit is shifted down the register in front of the information. The flag bit, is also used as a reset pulse for each of the parity flip-flops to avoid the problem of the parity flip-flops registering the passage of the flag bit as a One.

When the last information bit which can be accommodated by shift register 10 is inserted into the first position 12 of character 4, the flag bit is forced out of the sixth position 14 of character 1, and onto conductor 32.

At this time parity flip-flops 16, 18, 20 and 22 have also assumed their respective parity indications and manifest these by the energization of their One or Zero sides. The arrival of the flag bit on conductor 32 at each of gates 28, 26 and 24 results in the full conditioning of any gate where the Zero side (odd parity) of the respective parity flip-flop is also energized. This action causes a pulse to be transmitted to the input of the preceding parity flip-flop resulting in a change of its state. This is in accordance with the maxim that an odd parity indication manifests an erroneous preceding parity indication which must be, and is, corrected.

In accordance with the specific examples of Ones and Zeros which are illustrated in shift register 10 of FIG. 1, the respective parity flip-flops 16, 18, 20 and 22 will have assumed the states shown in the "before correction" row of the chart immediately above the block diagram. Upon correction, parity flip-flops 18 and 20 have their states reversed because each precedes an odd parity indication. Note that *after* correction, each flip-flop correctly indicates the parity bit for its associated character. For instance, note that character 3 has three One bits and, thus, an odd parity. Because an odd parity is that which is desired, the Zero side of flip-flop 18 is energized. On the other hand, character 2 having four One bits, is in need of an extra parity bit to satisfy the odd parity condition. This extra parity bit is supplied by the One condition of parity flip-flop 20.

This particular embodiment utilizes the flag bit to initiate the parity correction process, but it should be recognized that any signal, whether it comes from a flag bit, clock or alternative source of timed pulses will accomplish the same function.

After the parity generation and correction operation has been completed, the information may be read out of the serial shift register 10 and the One sides of the parity flip-flops in parallel to a utilization device such as a computer (not shown). After read-out, a reset pulse is generated which resets all flip-flops (the parity flip-flops being set to a state whereby the passage of the flag bit causes each one to be reset to its proper initial state).

If an even parity is desired, it requires only that in the readout of the shift register, the Zero sides rather than the One sides of the parity flip-flops be sampled.

Figure 3:
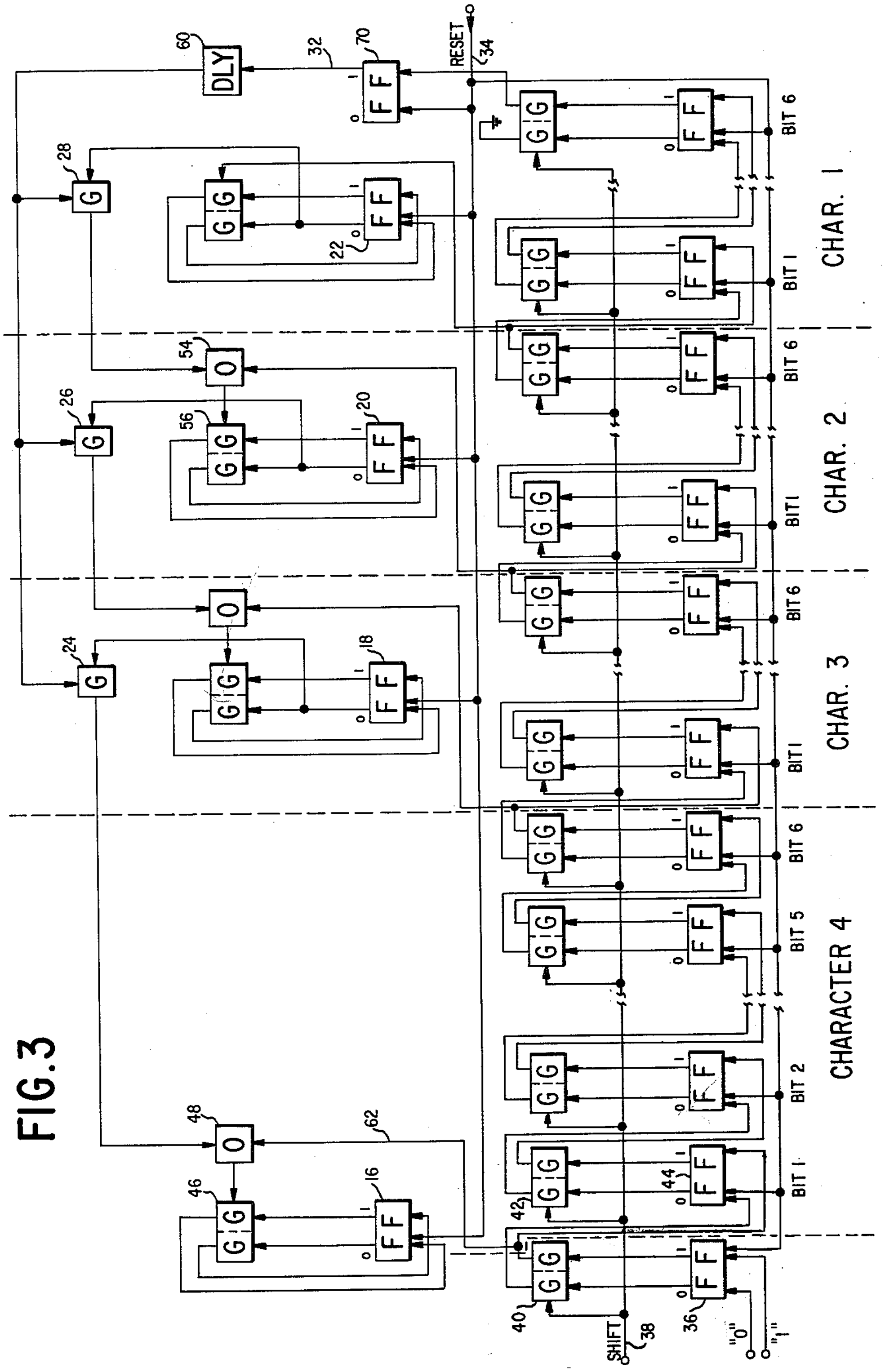
FIG. 3 is an expanded block diagram of the system as shown in FIG. 1.

Referring now to FIG. 3, there is shown a more detailed block diagram of the serial shift register and parity generation circuit illustrated in FIG. 1. For brevity's sake, not all positions of the series shift register have been illustrated.

The first operation which occurs is the resetting of all flip-flops by a reset pulse. This pulse is impressed upon Reset line 34 and acts to set all of the flip-flops except flip-flop 36 to the Zero state. Flip-flop 36 is reset to its One state, thereby producing the flag bit previously referred to in the description of FIG. 1.

The shift register and parity bit generation circuit are now ready to receive binary information. In this example a character length of 6 bits has been chosen. These will be referred to respectively as bits 1–6. It should be recognized that the particular character length chosen is not to limit the invention in any manner since the system operates in an identical manner with any set character length.

The digital information is entered into the storage register through entry flip-flop 36. The inputs to flip-flop 36 are represented as a double line transfer circuit wherein both Ones and Zeros are represented by positive pulses. However, a single line data transfer circuit could be used, each bit being succeeded by a reset pulse into flip-flop 36.

After each entry of a One or Zero into flip-flop 36, a shift pulse is applied to shift line 38 and thence to all the double gates, e.g., 40, 42, . . . in the shift register. The shift pulse conditions the double gates to transfer the contents of each flip-flop to the next succeeding flip-flop.

The first shift pulse applied after the reset pulse acts to transfer the flag bit from flip-flop 36 to flip-flop 44 through the right side of double gate 40. Since all other flip-flops are in their Zero state, the initial shift pulse has no effect on the remaining portions of the register. The initial shift pulse may also cause the entry of the first information bit into entry flip-flop 36.

The entry of digital information from the data source is now commenced. Each data pulse entered into flip-flop 36 is immediately succeeded by a shift pulse applied to shift line 38. In this manner, the information is propagated down the serial shift register until it is filled.

The parity flip-flops 16, 18, 20 and 22 are caused to reverse their states as each One bit is propagated from word to word. For instance, each time a One bit is shifted out of flip-flop 36, conductor 62 is energized and impulses double gate 46 through OR circuit 48. Double gate 46 is, thus, caused to change the state of parity flip-flop 16 in a well-known manner. A similar occurrence takes place at flip-flop 18, 20, and 22, as the One bits propagate from character to character down the register.

When the flag bit is propagated out of the bit 6 position of character 1, it impulses the One side of flip-flop 70 which in turn energizes conductor 32 with an up-level. Delay 60 acts to delay the leading edge of the up-level so as to prevent any of gates 24, 26 or 28 from being conditioned until their respective parity flip-flops have settled out of any transient status created by the last transfer of One bits from character to character. Assuming the Zero side of parity flip-flop 22 is energized (indicating an odd parity for the character), the arrival of the delayed up level at gate 28 causes it to produce an output to the correction circuit for parity flip-flop 20 which comprises OR circuit 54 and double gate 56. Double gate 56 is thereby sampled and reverses the state of parity flip-flop 20 thus correcting its erroneous parity indication. In a like manner, any parity flip-flop which immediately precedes a parity flip-flop whose Zero side is energized has its state automatically reversed.

At this point it should also be recognized that the circuit described hereinbefore can be utilized as a parity check circuit. If it is assumed that the data being shifted into the register has already had the parity bits appended, then the parity check flip-flops would all assume the same state after correction process is completed, thereby indicating a similar parity for all words. An error is detected and identified as applying to a particular character or characters, when one of the parity flip-flop manifests a different state from the rest. In this case, the information read-out operation could be inhibited and the error indicated.

The gates, flip-flops and delays referred to above in the description of the figures of the drawings may be of any suitable well known variety. Moreover, the substitution of any element which exhibits bistable characteristics, e.g., magnetic cores for the flip-flops, is intended to be within the scope of this invention.

While the invention has been particularly shown and described with reference to a preferred embodiment thereof, it will be understood by those skilled in the art that various changes in form and detail may be made therein without departing from the spirit and scope of the invention.

I claim:

1. In a parity circuit for coaction with a data handling circuit which includes a serial shift register wherein binary units may be serially entered, said register divided into character length sections, each said section having a discrete number of positions adapted to receive said binary units, the combination comprising:

a bistable means connected at the input of each said section, the stable state of each said bistable means being reversed upon the entry of a predetermined binary unit into said connected section, and a predetermined stable state of said bistable means representing the quantity, odd or even, of the total number of said predetermined binary units in said connected section when said shift register is filled with said binary units;

reset means connected to each said bistable means and providing an input thereto before each cycle of filling said register with said binary units, said input setting each said bistable means to an identical stable state;

signal means connected to said shift register for providing a signal when said shift register is filled; and a plurality of gate means, each said gate means connected between a different pair of said bistable means and providing a stable state reversing signal to the immediately preceding bistable means of said pair in response to essentially coincident inputs from said signal means and from the immediately succeeding bistable means of said pair, when said immediately succeeding bistable means is in the stable state representing an odd quantity of predetermined binary units in the section connected to said immediately succeeding bistable means, said stable state reversing signal placing said immediately preceding bistable means into said predetermined quantity representing stable state.

2. In a parity indication circuit for coaction with a data handling circuit which includes a serial shift register wherein binary information in the form of Ones and Zeros may be serially entered, said register being divided into character length sections, each section having a discrete number of positions adapted to receive said Ones or Zeros, the combination comprising:

a bistable means connected at the input of each said section, the stable state of each said bistable means being reversed by the passage of a binary One into said connected section so that said bistable means thereby manifests the passage of an odd number of One bits by a first stable state output and the passage of an even number of One bits by a second stable state output;

reset means connected to each said bistable means and providing an input thereto before each cycle of filling said register with said binary Ones and Zeros, said input setting each said bistable means to an identical stable state;

signal means connected to said shift register for providing a signal when said shift register is filled; and a plurality of gate means, each said gate means connected between a different pair of said bistable means and providing a stable state reversing signal to the immediately preceding bistable means of said pair in response to essentially coincident inputs from said signal means and from the immediately succeeding bistable means of said pair, when said immediately succeeding bistable means is in the stable state representing an odd quantity of One bits stored in the section connected to said immediately succeeding bistable means, said stable state reversing signal placing said immediately preceding bistable means into said stable state representing the quantity, odd or even, of One bits stored therein when said shift register is filled.

3. In a parity generation circuit for coaction with a data handling circuit which includes a serial shift register wherein binary information in the form of Ones and Zeros may be serially entered, said register divided into character length sections, each section having a discrete number of positions adapted to receive said Ones or Zeros, the combination comprising:

a bistable means connected at the input of each said section, the stable state of each said bistable means being reversed by the passage of a binary One into said connected section so that said bistable means thereby manifests the passage of an odd number of One bits by the energization of a first output manifesting a first stable state, and the passage of an even number of One bits by the energization of a second output manifesting a second stable state;

reset means connected to each said bistable means and providing an input thereto before each cycle of filling said register with said binary Ones and Zeros, said input setting each said bistable means to an identical stable state;

signal means connected to said shift register for providing a signal when said shift register is filled; and a plurality of gate means, each said gate means connected between a different pair of said bistable means and providing a stable state reversing signal to the immediately preceding bistable means of said pair in response to essentially coincident inputs from said signal means and from the immediately succeeding bistable means of said pair, when said immediately succeeding bistable means is in the stable state representing an odd quantity of One bits stored in the section connected to said immediately succeeding bistable means, said stable state reversing signal placing said immediately preceding bistable means into said stable state representing a quantity, odd or even, of One bits stored therein when said shift register is filled.

4. In a serial shift circuit, having a shift register which receives a plurality of binary words of information expressed as Ones and Zeros, said shift register having a multiplicity of connected bistable means forming serially connected character length blocks, the combination comprising:

entry means connected to the first of said bistable means and providing input signals representing said Ones and said Zeros to said first bistable means;

a plurality of shift means, each said shift means connected between different pairs of said bistable means, and each said shift means, after each operation of said entry means, providing an output signal to the immediately succeeding bistable means of said pair in response to an input signal from the immediately preceding bistable means of said pair, said input and said output signal each being indicative of the binary One or Zero entered into said immediately preceding bistable means of said pair by said operation of said entry means;

plural indicating means, each said indicating means connected to the first bistable means of each said block and manifesting a first or second stable state output, respectively indicating whether an odd or even number of Ones has been entered into each said block;

signal means connected to said shift register for providing a signal when said register is filled to capacity;

reset means connected to each said bistable means and providing an input thereto before each cycle of filling said register with said binary Ones and Zeros, said input setting each said bistable means to an identical stable state;

and correction means connected between different pairs of said indicating means each said correction means providing a signal to the immediately preceding indicating means of each said pair so as to cause said preceding indicating means to assume the stable state indicative of the quantity, odd or even, of Ones stored in said block to which said preceding indicating means is connected, said signal being provided when said correction means receives essentially coincident inputs from said signal means and said immediately succeeding indicating means.

No references cited.